I. B. CASEY.
TRACTION WHEEL.
APPLICATION FILED NOV. 18, 1911.
1,124,209. Patented Jan. 5, 1915.
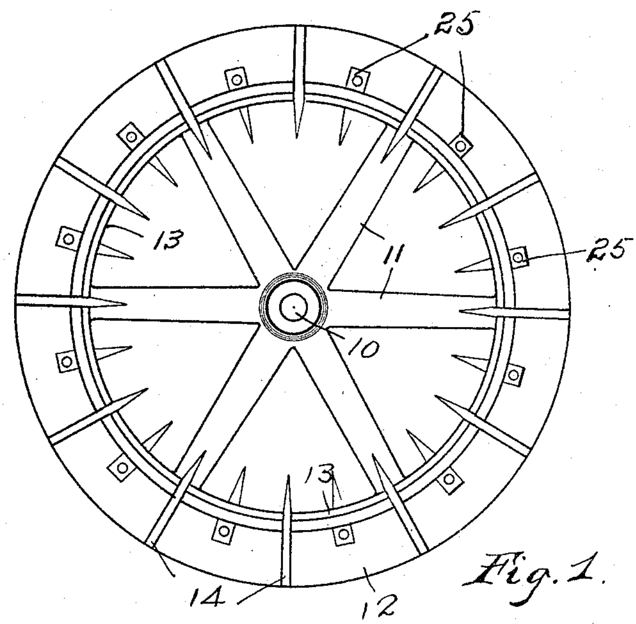
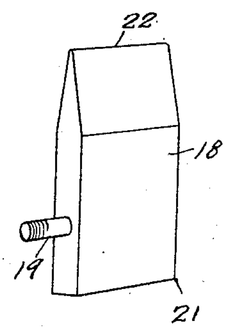
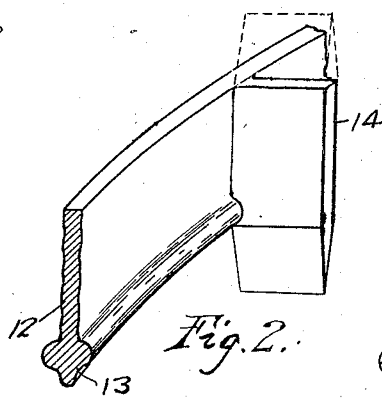
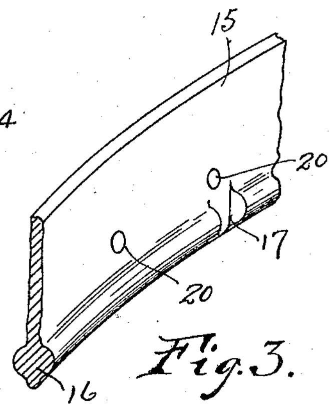
WITNESSES
Nannie Mern
L. L. Morrill
INVENTOR
Irby B. Casey
BY Mason Fenwick & Lawrence,
ATTORNEYS
PETERS, INC., LITHO., WASHINGTON, D. C.

UNITED STATES PATENT OFFICE.

IRBY B. CASEY, OF KIESLING STATION, WASHINGTON.

TRACTION-WHEEL.

1,124,209. Specification of Letters Patent. Patented Jan. 5, 1915.

Application filed November 18, 1911. Serial No. 661,100.

*To all whom it may concern:*

Be it known that I, IRBY B. CASEY, a citizen of the United States, residing at Kiesling Station, in the county of Spokane and State of Washington, have invented certain new and useful Improvements in Traction-Wheels; and I do hereby declare the following to be a full, clear, and exact description of the invention, such as will enable others skilled in the art to which it appertains to make and use the same.

This invention relates to traction wheels and has for an object to provide a wheel especially designed and adapted for a traction wheel for agricultural implements, although not limited to such use.

A further object of the invention is to provide a wheel having a peripheral web of sufficient dimensions to carry the vehicle mounted upon the wheel over ordinary hard roads but providing fins for engaging with the earth when softer ground is encountered to provide the necessary traction resistance.

It is well known that in ordinary agricultural traction wheels the fins or lugs which engage the earth are secured upon the exterior of the periphery of the wheel, whereby, when the wheel is driven over hard or unyielding surface, a jarring or vibration is produced by such lugs engaging the surface of the earth. The present invention is distinguished from such construction by employing a circular web in the center of the wheel without ordinarily any projection extending beyond such web but only of such width as to sustain the vehicle or implement upon hard ground, permitting it to sink in softer ground and to engage the laterally extending webs or lugs carried by such peripheral ring.

A further object of the invention is to provide, in a device of this kind, adjustable or invertible lugs so arranged that when the ground is unusually hard and the implement would slip upon the surface, sharpened lugs in the nature of calks are provided for the engagement with such hard, unyielding surface.

With these and other objects in view the invention comprises certain novel constructions, combinations and arrangements of parts as will be hereinafter more fully described and claimed.

In the drawings: Figure 1 is a view of the improved traction wheel in side elevation. Fig. 2 is a perspective view of a fragment of the rim of the traction wheel as shown at Fig. 1. Fig. 3 is a perspective view of the rim of the wheel. Fig. 4 is a perspective view of one of the invertible, replaceable lugs employed with the rim shown at Fig. 4.

Like characters of reference indicate corresponding parts throughout the several views.

The wheel which forms the subject matter of the present application comprises a hub 10 and spokes 11 of substantially the usual and ordinary form employed upon traction wheels for agricultural implements. Upon the extremities of the spokes 11 a rim 12 is carried, being a thin web substantially in the plane with the spokes and at right angles to the axis of the wheel. For strengthening the rim a reinforcing bead 13 is employed at times.

The rim 12, as seen in Figs. 2 and 3, has the rib 13 thereof provided with cutaway portions 17 located beneath openings 20, said cutaway portions of the bead, as shown at 17, being positioned and proportioned so as to receive lugs 18 from which extend the bolt 19, the outer end of which is threaded and adapted to extend through opening 20 placed above the notched out or cutaway portion 17. The end 21 of the lug 18 is made substantially planate, while the opposite end is wedge shaped, as seen at 22 in Fig. 4. It will be understood that the bolt or stud 19 is located at such a point upon lug 18 that when the stud is inserted in one of the openings 20 the edge 21 will be substantially in alinement with the periphery of the web 12 when the lug is on one position while when the lug is reversed the wedge or chisel edge 22 will extend beyond the periphery of the web 12. The first of these positions is to be seen in full lines in Fig. 2, while the second of the positions, where the rib extends beyond the periphery of the web 12, is to be seen in dotted lines. Nuts 25 may be placed upon opposite side of the web to that carrying lugs for the purpose of engaging the threaded end of stud 19. When the end 22 is turned outermost the pointed or chisel end of such replaceable lug extends peripherally beyond the edge of the web 12 to engage with unusually hard or unyielding surfaces to provide traction for the wheel upon such surfaces.

I claim:—

1. In a wheel, a hub and spokes, a web positioned substantially at right angles to the axis of the wheel, and invertible lugs positioned upon one side of the web and arranged in one position to extend beyond the periphery of the web and in another position to register with the periphery of such web.

2. In a wheel, a hub and spokes, an annular web positioned substantially at right angles to the axis of the wheel, and invertible lugs positioned upon one side of the web and arranged in one position to maintain and present a chisel edge beyond the periphery of the web and in another position to substantially register with the periphery of such web.

3. In a traction wheel, a rim formed with a laterally projecting bead, said bead being formed with a series of spaced recesses and the rim being formed with openings which are respectively arranged in alinement with the recesses on a radius of the wheel, a reversible lug seated in each recess, and locking means for the lug extending through the alined opening in the rim.

In testimony whereof I affix my signature in presence of two witnesses.

IRBY B. CASEY.

Witnesses:
H. E. Smith,
Nettie King.

Copies of this patent may be obtained for five cents each, by addressing the "Commissioner of Patents, Washington, D. C."